(12) United States Patent
Konuma et al.

(10) Patent No.: US 7,152,978 B2
(45) Date of Patent: Dec. 26, 2006

(54) LIQUID CRYSTAL PROJECTOR, AND PROJECTION LENS UNIT, OPTICAL UNIT AND COOLING SYSTEM FOR THE SAME

(75) Inventors: Nobuhiko Konuma, Yokohama (JP); Hidetomo Yoshimura, Zushi (JP); Seiichi Sekiguchi, Fujisawa (JP); Mikiharu Kuwata, Fujisawa (JP); Masaharu Deguchi, Yokohama (JP); Takashi Kakuda, Yokohama (JP); Yutaka Matsuda, Yokohama (JP); Takuya Shiaki, Sagamihara (JP); Futoshi Yamasaki, Yokohama (JP); Atsushi Ishibashi, Kokubunji (JP); Koichi Umezawa, Kodaira (JP); Takeshi Hoshino, Kodaira (JP); Shigehisa Hagura, Akishima (JP); Makoto Fukatsu, Kokubunji (JP); Nobuyuki Kaku, Naka-gun (JP); Kenji Fuse, Yokosuka (JP); Satoshi Ohuchi, Kamakura (JP); Tomohiro Miyoshi, Fujisawa (JP); Naohiro Ozawa, Hiratsuka (JP); Masahiko Yatsu, Fujisawa (JP); Yasuo Otsuka, Chigasaki (JP); Takesuke Maruyama, Yokohama (JP)

(73) Assignee: Hitachi, Ltd., and Hitachi Video and Information Systems, Inc., Tokyo (JP)

( * ) Notice: Subject to any disclaimer, the term of this patent is extended or adjusted under 35 U.S.C. 154(b) by 0 days.

(21) Appl. No.: 10/972,448

(22) Filed: Oct. 26, 2004

(65) Prior Publication Data

US 2005/0083490 A1    Apr. 21, 2005

Related U.S. Application Data

(63) Continuation of application No. 10/422,952, filed on Apr. 25, 2003, now Pat. No. 6,824,273, which is a continuation of application No. 09/791,702, filed on Feb. 26, 2001, now Pat. No. 6,783,245, which is a continuation of application No. 09/195,900, filed on Nov. 19, 1998, now Pat. No. 6,290,360.

(30) Foreign Application Priority Data

Nov. 20, 1997 (JP) .................. 9-319907
Nov. 25, 1997 (JP) .................. 9-323312

(51) Int. Cl.
G03B 21/16 (2006.01)
(52) U.S. Cl. ............................. 353/57; 353/60; 353/61
(58) Field of Classification Search ............. 353/57, 353/58, 60, 61, 119, 31, 34, 37
See application file for complete search history.

(56) References Cited

U.S. PATENT DOCUMENTS

| | | | |
|---|---|---|---|
| 5,860,719 | A | 1/1999 | Suzuki et al. |
| 5,951,136 | A | 9/1999 | Furuhata et al. |
| 6,007,205 | A | 12/1999 | Fujimori |
| 6,033,077 | A | 3/2000 | Iwase |
| 6,111,630 | A | 8/2000 | Watanuki et al. |
| 6,139,155 | A | 10/2000 | Takizawa |
| 6,254,238 | B1 | 7/2001 | Takamatsu |
| 6,290,360 | B1 | 9/2001 | Konuma et al. |

FOREIGN PATENT DOCUMENTS

| | | |
|---|---|---|
| JP | 02-130542 | 5/1990 |
| JP | 05-053200 | 3/1993 |
| JP | 05105115 | 4/1993 |
| JP | 06-148594 | 5/1994 |
| JP | 07-152009 | 6/1995 |
| JP | 08-234155 | 9/1996 |
| JP | WO 96/30805 | 10/1996 |
| JP | 09-049998 | 2/1997 |
| JP | 09-133911 | 5/1997 |
| JP | 10-254062 | 9/1998 |

Primary Examiner—William C. Dowling
(74) Attorney, Agent, or Firm—Mattingly, Stanger, Malur & Brundidge, P.C.

(57) ABSTRACT

A liquid crystal projector comprises an illuminating optical system including a light source, a color separating optical system for separating illuminating light rays emitted by the illuminating optical system into light rays of three colors, a projection lens unit comprising a projection lens, a cross dichroic prism disposed near a light receiving end of the projection lens, and a plurality of liquid crystal panels arranged around the cross dichroic prism, and a light source power supply for supplying power to the light source. The projection lens unit, the color separating optical system, the illuminating optical system and the light source power supply are arranged in that order. The liquid crystal projector has an outside size in a horizontal plane of 263 mm by 318 mm or below. The liquid crystal panels have a display screen size of 0.9 in. A cooling fan for cooling the plurality of liquid crystal panels is disposed beside the projection lens.

10 Claims, 12 Drawing Sheets

LIQUID CRYSTAL PROJECTOR, AND PROJECTION LENS UNIT, OPTICAL UNIT AND COOLING SYSTEM FOR THE SAME

This is a continuation application of U.S. Ser. No. 10/422, 952, filed Apr. 25, 2003 (now U.S. Pat. No. 6,824,273), which is a continuation application of Ser. No. 09/791,702, filed Feb. 26, 2001, now U.S. Pat. No. 6,783,245, which is a continuation application of U.S. Ser. No. 09/195,900, filed on Nov. 19, 1998, now U.S. Pat. No. 6,290,360.

BACKGROUND OF THE INVENTION

1. Field of the Invention

The present invention relates to a liquid crystal projector for displaying a picture on a screen by projecting light rays emitted by a light source onto three liquid crystal panels and transmitted by the three liquid crystal panels, and a projection lens unit, an optical unit and a cooling system to be employed in the liquid crystal projector.

2. Description of the Related Art

A prior art liquid crystal projector provided with three liquid crystal panels is disclosed in, for example, JP-A No. 6-289392. This prior art liquid crystal projector comprises, as principal components, a light source, a cold mirror, a blue light reflecting dichroic mirror (hereinafter referred to as "B light reflecting dichroic mirror"), a green light reflecting dichroic mirror (hereinafter referred to as "G light reflecting dichroic mirror"), image reflecting mirrors, a red-light liquid crystal panel (hereinafter referred to as "R liquid crystal panel"), a green-light liquid crystal panel (hereinafter referred to as "G liquid crystal panel"), a blue-light liquid crystal panel (hereinafter referred to as "B liquid crystal panel"), a combining dichroic prism and a projection lens. Light rays emitted by the light source are divided into R, G and B light rays by the light transmitting and reflecting agencies of the cold mirror, the B light reflecting dichroic mirror and the G light reflecting dichroic mirror, the light rays are reflected by the image reflecting mirrors toward the R, G and B liquid crystal panels. The light rays traveled through the R, G and B liquid crystal panels are combined by the dichroic prism and a color picture is projected through the projection lens in an enlarged color picture on a screen.

Such a known, commercialized liquid crystal projector employs three 1.3 in. liquid crystal panels. is formed in a compact construction and is capable of displaying pictures in a high definition.

The foregoing liquid crystal projector is provided with a cooling system for suppressing the temperature rise of the liquid crystal panels.

Referring to FIG. 1 showing a known liquid crystal projector in a side view, a cooling fan 81 (an axial fan in this liquid crystal projector) is disposed below three 1.3 in. liquid crystal panels (only liquid crystal panels 14 and 18 are shown) to blow air toward the liquid crystal panels including the liquid crystal panels 14 and 18 to suppress the temperature rise of the liquid crystal panels including the liquid crystal panels 14 and 18. Since the liquid crystal panels including the liquid crystal panels 14 and 18 are exposed directly to air delivered by the cooling fan 81, the liquid crystal panels including the liquid crystal panels 14 and 18 can effectively cooled. In FIG. 1, indicated at 27 is a projection lens.

The outside size in a horizontal plane of this liquid crystal projector provided with the three 1.3 in. liquid crystal panels excluding a projecting part of the projection lens projecting from a case is 245 mm by 329 mm, and the overall outside size in a horizontal plane of the liquid crystal projector including the projecting part of the projection lens is 245 mm by 380 mm. Such a large overall outside size of the liquid crystal projector is a problem in storing and carrying the liquid crystal projector, and the reduction of the overall outside size of the liquid crystal projector has been desired.

The inventors of the present invention examined a concept about miniaturization necessary to realize a liquid crystal projector more compact than the prior art liquid crystal projector and found that a liquid crystal projector provided with three liquid crystal panels must be formed in the smallest possible outside size suitable for storing the liquid crystal projector in a prevalently used storage cabinet and for carrying the same in a prevalently used carrying case.

The known liquid crystal projector shown in FIG. 1 has a height L2 equal to the sum of the height of a part including the projection lens 27 and the liquid crystal panels 14 and 18, and the height of the cooling fan 81. The liquid crystal projector has a dead space under the projection lens 27, which increases the overall height of the liquid crystal projector.

SUMMARY OF THE INVENTION

Accordingly, it is a first object of the present invention to provide a liquid crystal projector of an outside size capable of being stored in a prevalently used storage cabinet and of being carried in a prevalently used carrying case.

Another object of the present invention is to provide a liquid crystal projector having a small height and formed in a compact construction.

A third object of the present invention is to provide a projection unit and an optical unit effective in forming a liquid crystal projector in a compact construction.

A fourth object of the present invention is to provide a cooling system capable of efficiently cooling a liquid crystal projector.

With the foregoing objects in view, the present invention provides a liquid crystal projector having a size in a horizontal plane substantially equal to an A4 folder size, i.e., the size of folders for holding papers of the trimmed sheet size A4. The A4 folder size is 263 mm by 318 mm. The liquid crystal projector of the present invention subjects light rays emitted by a light source to color separation to divide the light rays, projects the divided light rays on a first liquid crystal panel, a second liquid crystal panel and a third liquid crystal panel, combines the light rays traveled through the first, the second and the third liquid crystal panel, and projects the combined light rays on a screen through a projection lens. The outside size in a horizontal plane of the liquid crystal projector is the outside size of a case serving as a housing for the liquid crystal projector. The outside size in a horizontal plane of the liquid crystal projector may be the sum of the size of the case and that of a part projecting from the case. The size of the first, the second and the third liquid crystal panel is 0.9 in. or below. The distance between the display surface of the liquid crystal panel disposed substantially perpendicularly to the optical axis of the projection lens and the extremity of the projection lens is about 146 mm or below. The liquid crystal projector is provided with a color combining optical system including a cross dichroic prism for color combination. The cross dichroic prism has a size in a horizontal plane of 32 mm by 32 mm or below.

A liquid crystal projector according to the present invention comprises a color separation optical system comprising a cross dichroic prism, and a first dichroic mirror, a second dichroic mirror, a first mirror, a second mirror and a third mirror arranged around the cross dichroic prism, an illuminating system comprising a light source, a polarizing device and an optical integrating means, liquid crystal and a projection lens unit comprising a light source power supply for supplying power to the light source, and a projection lens unit comprising a plurality of liquid crystal panels, a cross dichroic prism and a projection lens, in which the projection lens unit, the color separating optical system, the illuminating optical system, and the light source power supply are arranged in that order.

A liquid crystal projector according to the present invention comprises a color separating optical system comprising a first dichroic mirror, a second dichroic mirror, and a first mirror, a second mirror and a third mirror arranged around a cross dichroic mirror, an illuminating optical system comprising a light source, a polarizing device, and an optical integrating means, a light source power supply for supplying power to the light source, and a projection lens unit comprising a plurality of liquid crystal panels, a cross dichroic prism and a projection lens, in which the combination of the projection lens unit and the color separating optical system, the illuminating optical system and the light source power supply are arranged in that order. An exhaust fan is disposed near the light source. A cooling fan and a duct for guiding cooling air delivered by the cooling fan to the first, the second and the third liquid crystal panel are disposed beside the projection lens.

A projection lens unit according to the present invention comprises a projection lens, a cross dichroic prism disposed on the light receiving side of the projection lens, first, second and third liquid crystal panels, and a structural means for arranging the first, the second and the third liquid crystal panel around the cross dichroic prism with the second liquid crystal panel set substantially perpendicularly to the optical axis of the projection lens, in which the distance between the display surface of the second liquid crystal panel and the extremity of the projection lens is about 146 mm or below, and the size in a horizontal plane of the cross dichroic prism is 32 mm by 32 mm.

An optical unit according to the present invention comprises an illuminating optical system including a light source, a color separation optical system for separating light rays received from the illuminating optical system into light rays of three colors, first, second and third liquid crystal panels which receive the light rays of three colors, respectively, and a cross dichroic prism for combining light rays traveled through the first, the second and the third liquid crystal panel, in which the size of the display screen of the first, the second and the third liquid crystal panel is 0.9 in. or below and the size in a horizontal plane of the cross dichroic prism is 32 mm or below by 32 mm or below.

A liquid crystal projector according to the present invention comprises a housing, a first cooling system having a sealed duct including liquid crystal panels, a second cooling system disposed inside the housing to cool the duct from outside, in which the liquid crystal panels are cooled directly by the first cooling system and are cooled indirectly by the second cooling system. The first cooling system is provided with a cooling fan. The size in a horizontal plane of the liquid crystal projector is nearly equal to or below the A4 folder size.

A liquid crystal projector according to the present invention comprises a plurality of cooling fans for cooling liquid crystal panels, in which at least one of the cooling fans is disposed beside the projection lens. One of the plurality of cooling fans is used specially for cooling the liquid crystal panels. The cooling fan specially for cooling the liquid crystal panels has a cooling duct divided into a plurality of sections so that cooling air flows toward the G liquid crystal panel at a velocity or a flow rate greater than that at which cooling air flows toward the rest of the liquid crystal panels. One of those cooling fans is a centrifugal fan.

A cooling system according to the present invention comprises a plurality of liquid crystal panels, a cooling fan, a duct for distributing a cooling fluid delivered by the cooling fan to the plurality of liquid crystal panels, and a plurality of guide members disposed in the duct to adjust the velocity or the flow rate of the cooling fluid flowing to each of the liquid crystal panels. The guide members adjust the flow of the cooling fluid so that the cooling fluid flows toward one of the liquid crystal panels at a velocity or a flow rate greater than that at which the cooling fluid flows toward the other liquid crystal panel. The duct is extended between the cooling fan and the plurality of liquid crystal panels. The duct is formed so as to blow the cooling fluid upward from below the plurality of liquid crystal panels. The duct may be extended from the cooling fan to the plurality of liquid crystal panels and from the plurality of liquid crystal panels to the cooling fan.

A projection lens unit according to the present invention comprises a projection lens, a cross dichroic prism disposed on the light receiving side of the projection lens, first, second and third liquid crystal panels disposed around the cross dichroic prism, a cooling fan disposed beside the projection lens, a duct for carrying a cooling fluid delivered by the cooling fan to the first, the second and the third liquid crystal panel, and a plurality of guide members disposed in the duct to adjust velocities or flow rates at which the cooling fluid flows toward the first, the second and the third liquid crystal panel, respectively.

An optical unit according to the present invention comprises an illuminating optical system including a light source, a color separating optical system for separating light rays received from the illuminating optical system into light rays of three colors, a cross dichroic prism, first, second and third liquid crystal panels arranged around the cross dichroic prism, a cooling fan, a duct for carrying a cooling fluid delivered by the cooling fan toward the first, the second and the third liquid crystal panel, and a plurality of guide members disposed in the duct to control velocities or flow rates at which the cooling fluid flows toward the first, the second and the third liquid crystal panel, respectively.

A cooling system according to the present invention is capable of optionally regulating velocities and flow rates at which air delivered by a cooling fan flows toward a plurality of liquid crystal panels so that the temperature rise of each of the plurality of liquid crystal panels is limited to the lowest possible extent.

The velocities and the flow rates are controlled so that the flow rate and the velocity at which air flows toward the G liquid crystal panel are the highest and the flow rate and the velocity at which air flows toward the R liquid crystal panel are the lowest.

These and other objects, features and advantages of the invention will be apparent from the following more particular description of preferred embodiments of the invention, as illustrated in the accompanying drawings.

DESCRIPTION OF THE PREFERRED EMBODIMENTS

Preferred embodiments of the present invention will be described hereinafter with reference to the accompanying drawings.

Figure 1:
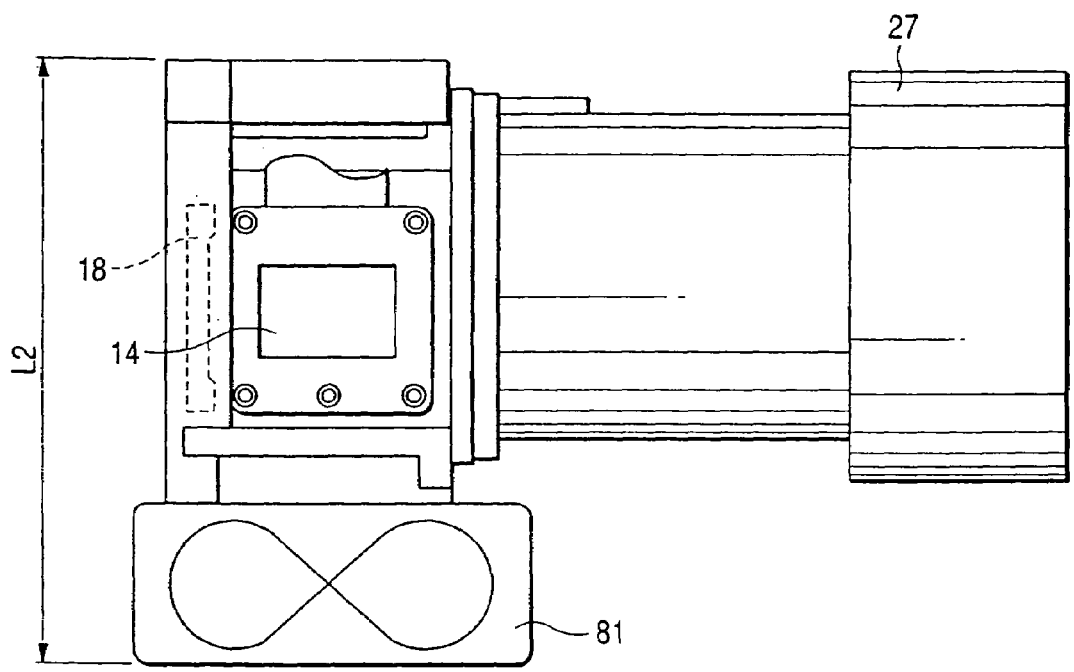
FIG. 1 is a schematic side view of a prior art liquid crystal projector.
Figure 2:
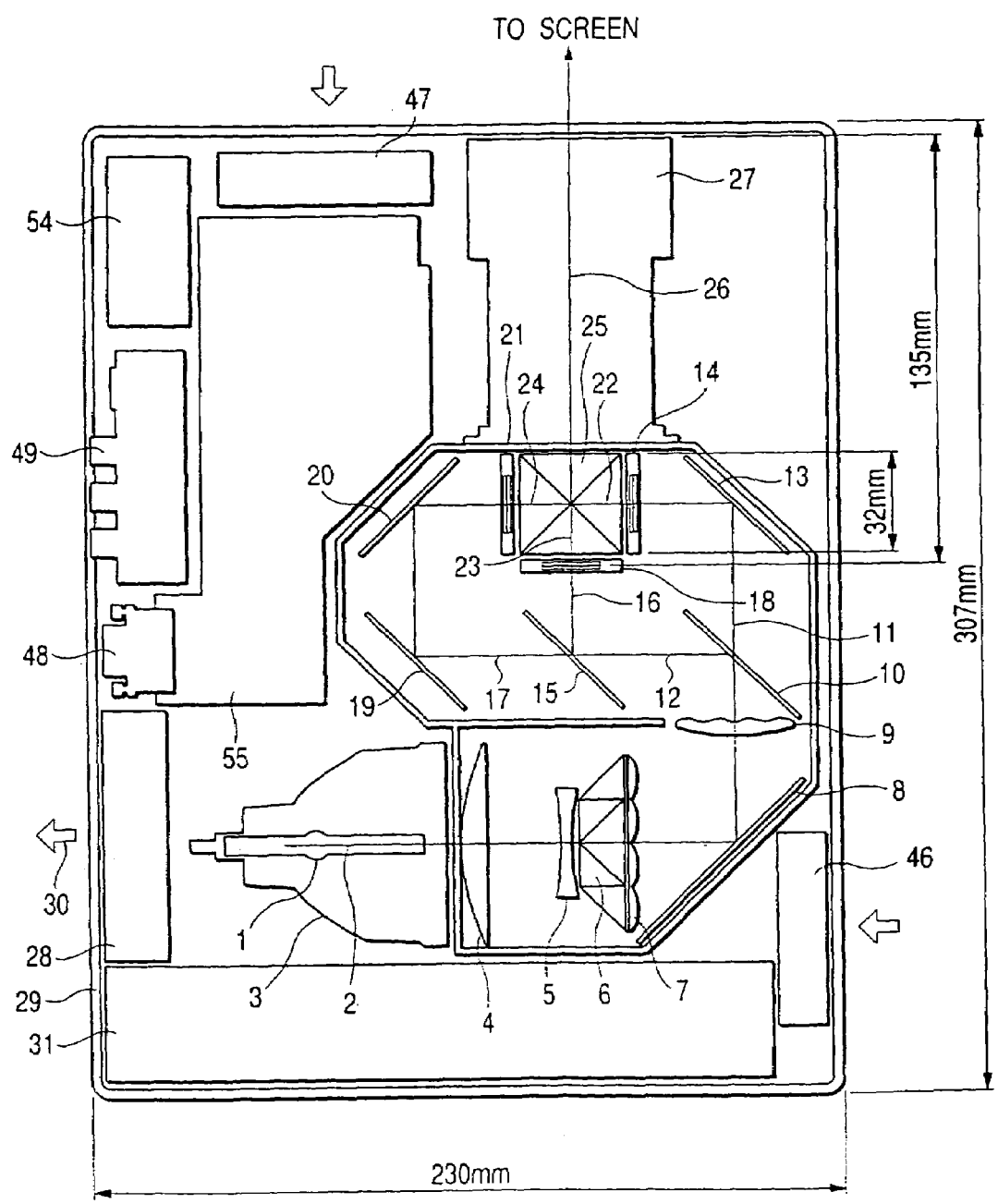
FIG. 2 is a schematic plan view of a liquid crystal projector in a first embodiment according to the present invention.

Referring to FIG. 2 showing a liquid crystal projector in a first embodiment according to the present invention in a schematic plan view, light rays 2 emitted by a discharge lamp 1, i.e., a light source, are reflected by a parabolic lamp reflector 3, travel through a lens 4, a lens 5, a polarizing device 6, a first lens array 7, a mirror 8 and a second lens array 9, and fall on a dichroic mirror 10. The dichroic mirror 10 allows R light rays 11 to pass through and reflects G and B light rays 12. The R light rays 11 are reflected by a mirror 13 toward an R liquid crystal panel 14. The G and B light rays 12 fall on a dichroic mirror 15 which reflects the G light rays and allows the B light rays to pass through. The G light rays 16 are reflected by the dichroic mirror 15 toward and fall on a G liquid crystal panel 18. The B light rays 17 are reflected by mirrors 19 and 20 toward and fall on a B liquid crystal panel 21. R transmitted light rays 22 traveled through the R liquid crystal panel 14, G transmitted light rays 23 traveled through the G liquid crystal panel 18 and B transmitted light rays 24 traveled through the B liquid crystal panel 21 are combined for color combination by a cross dichroic prism 25, and composite color light rays 26 are projected through a projection lens 27 on a screen, not shown.

An exhaust fan 28 for cooling the discharge lamp 1 is disposed near the discharge lamp 1 and the lamp reflector 3 to discharge hot air 30 heated by heat generated by the high-temperature discharge lamp 1, i.e., the light source, from a case 29 in order that the component parts of the liquid crystal projector may not be affected by heat generated by the discharge lamp 1. A lamp power supply 31 is disposed near the discharge lamp 1. Suction fans 46 and 47 suck ambient air into the case 29. In FIG. 2, indicated at 48 and 49 are connectors, at 54 is an electrical part, and at 55 is a wiring board.

In the first embodiment, the first dichroic mirror 10, the second dichroic mirror 15, the first mirror 13, the second mirror 19 and the third mirror 20 included in a color separating optical system are arranged around the cross dichroic prism 25. An illuminating optical system is designed for efficient use of illuminating light and comprises the discharge lamp 1, the lamp reflector 3, the lens 4, the lens 5, the polarizing device 6, and an optical integrating means including the first lens array 7, the mirror 8 and the second lens array 9. The lamp power supply 31 for supplying power to the discharge lamp 1 is disposed adjacent to the discharge lamp 1.

In the first embodiment, the projection lens 27, the cross dichroic prism 25, the color separating optical system, the illuminating optical system and the lamp power supply 31 are arranged in that order.

The projection lens 27 is disposed in the case 29 so that the projection lens 27 is contained entirely in the case 29 or a part of the projection lens 27 projects outside from the case 29. The outside size in a horizontal plane of the liquid crystal projector in the first embodiment including a projecting parts is not greater than that of an A4 folder. The outside size of the liquid crystal projector in the first embodiment is 307 mm by 230 mm. The outside size of a conventional liquid crystal projector not including projecting parts is about 245 mm by about 329 mm, and the outside size of the same including a projecting part of its projection lens is 245 mm by 380 mm.

Figure 3:
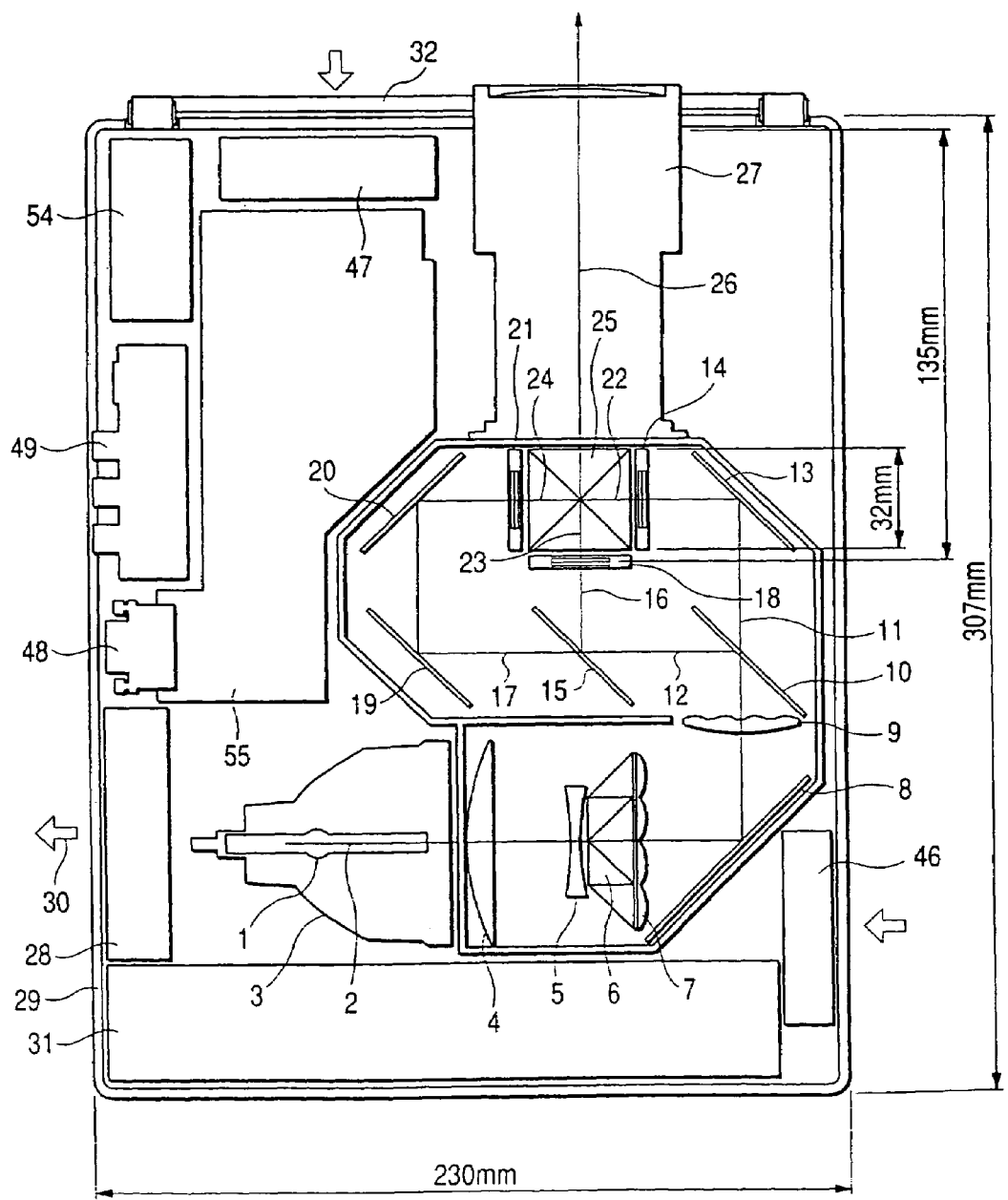
FIG. 3 is a schematic plan view of assistance in explaining a projecting part in a liquid crystal projector according to the present invention.

The projecting parts of the liquid crystal projector will be described with reference to FIG. 3. A liquid crystal projector according to the present invention shown in FIG. 3 in a schematic plan view differs from the liquid crystal projector shown in FIG. 2 in that the liquid crystal projector shown in FIG. 3 is provided with a handle 32 and a part of a projection lens 27 projects from a case 29, whereas the liquid crystal projector shown in FIG. 2 is not provided with any member corresponding to the handle 32 and has the projection lens 27 entirely contained in the case 29. The handle 32 can be pulled out from the case 29 to use the same when carrying the liquid crystal projector. In the present invention, the handle 32 and the part of the projection lens 27 projecting outside from the case 29 will be called projecting parts.

The outside sizes of liquid crystal projectors according to the present invention need not be limited to that of the liquid crystal projector in the first embodiment shown in FIG. 2 and may be substantially equal to the A4 folder size. Inquiries into the sizes of A4 folders showed that the smallest A4 folder size is 230 mm by 307 mm, a medium A4 folder size is 243 mm by 307 mm and the largest A4 folder size is 263 mm by 318 mm. Therefore, the outside size of the liquid crystal projector of the present invention may be 263 mm by 318 mm or below. The liquid crystal projector having an external shape as shown in FIG. 2 can be stored in a prevalently used storage cabinet and can be carried in a prevalently used carrying case.

Although it is more technically difficult to form a liquid crystal projector in a smaller size, a liquid crystal projector having a smaller size enables the use of more kinds of prevalently used storage cabinets and carrying cases.

The liquid crystal projector in the first embodiment employs liquid crystal panels having a small screen size to form the liquid crystal projector in an outside size meeting the foregoing conditions. In the liquid crystal projector in the first embodiment, the screen size of the liquid crystal panels 14, 18 and 21 is 0.9 in., which is smaller than a screen size of 1.3 in., i.e., the screen size of the liquid crystal panels employed in the conventional liquid crystal projector. The projection lens 27 and the cross dichroic prism 25 may be small and the dimensions of the color separating optical system can be reduced accordingly when the small liquid crystal panels having a screen size of 0.9 in. are employed.

In the prior art liquid crystal projector, the distance between the surface of the liquid crystal panel and the extremity of the projection lens is 180 mm, whereas the distance between the display surface of the G liquid crystal panel 18 and the extremity of the projection lens 27 of the liquid crystal projector in the first embodiment is 135 mm, and the liquid crystal projector in the first embodiment has a size equal to the smallest A4 folder size. The distance may be 146 mm or below for a liquid crystal projector of an A4 folder size greater than the smallest A4 folder size because the difference between the longitudinal dimension of 138 mm of the largest A4 folder size and that of 307 mm of the smallest A4 folder size is 11 mm.

In the liquid crystal projectors shown in FIGS. 2 and 3, the distance between the display surface of the G liquid crystal panel 18 and the extremity of the projection lens 27 is 135 mm. The distance can be increased to 170 mm if the position of the lamp power supply 31 is changed.

The liquid crystal projector in the first embodiment is provided with a color combining optical system including the cross dichroic prism 25 of 32 mm by 32 mm in size in a horizontal plane to form the liquid crystal projector in the A4 folder size. The use of the cross dichroic prism 25 of 32 mm by 32 mm or below enables the miniaturization of the color separating optical system. A cross dichroic prism employed in the prior art liquid crystal projector is 43 mm by 37 mm in size.

Although the depth of the liquid crystal projector in the first embodiment is greater than the width of the same, the depth may be smaller than the width.

Figure 4:
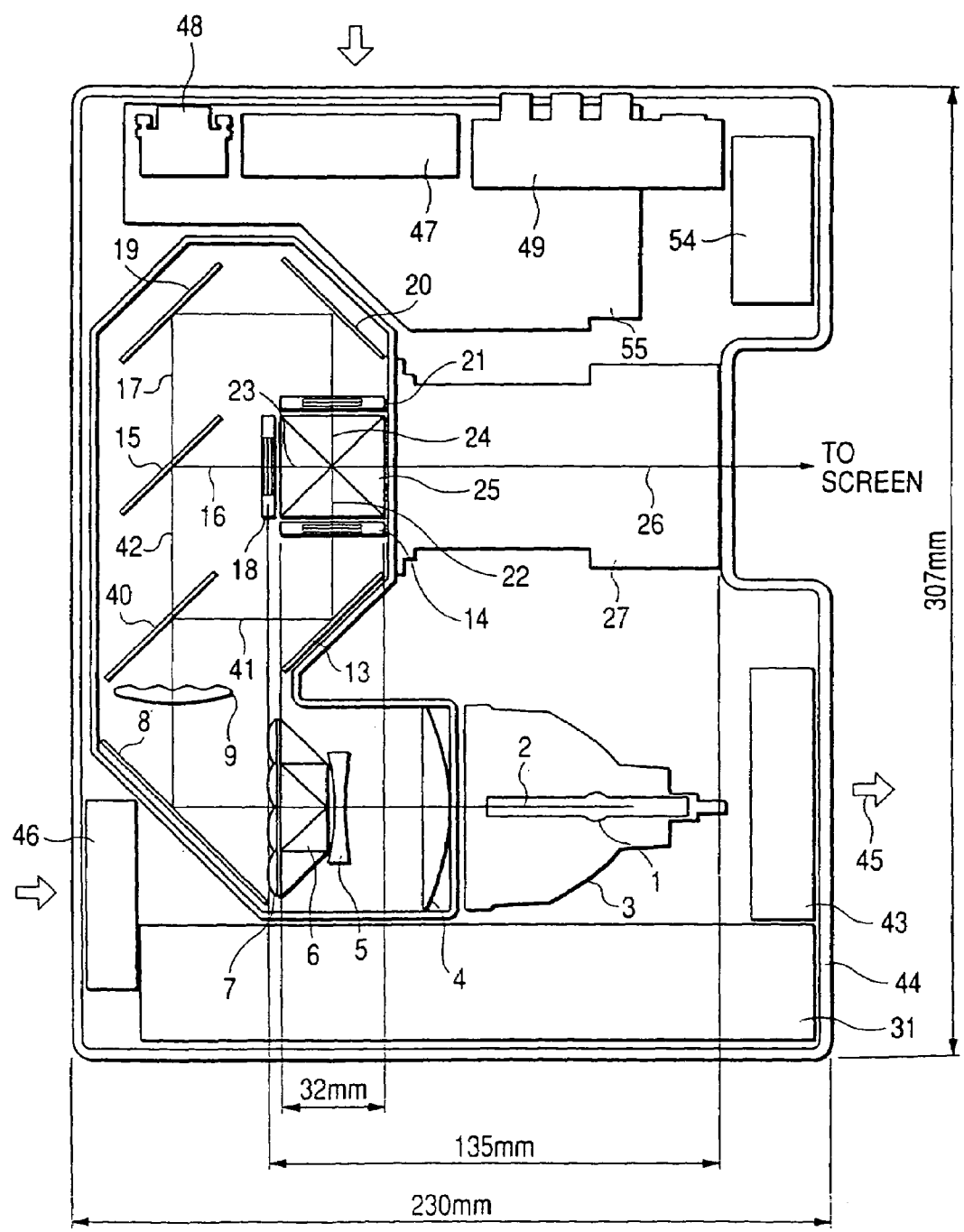
FIG. 4 is a schematic plan view of a liquid crystal projector in a second embodiment according to the present invention.

Referring to FIG. 4 showing a liquid crystal projector in a second embodiment according to the present invention in a schematic plan view, light rays 2 emitted by a discharge lamp 1, i.e., a light source, are reflected by a parabolic lamp reflector 3, travel through a lens 4, a lens 5, a polarizing device 6, a first lens array 7, a mirror 8 and a second lens array 9, and fall on a dichroic mirror 40. The dichroic mirror 40 reflects R light rays 41 and allows G and B light rays 42 to pass through. The R light rays 41 are reflected by a mirror 13 toward an R liquid crystal panel 14. The G and B light rays 42 fall on a dichroic mirror 15 which reflects the G light rays and allows the B light rays to pass through. The G light rays 16 are reflected by the dichroic mirror 15 toward and fall on a G liquid crystal panel 18. The B light rays 17 are reflected by mirrors 19 and 20 toward and fall on a B liquid crystal panel 21. R transmitted light rays 22 traveled through the R liquid crystal panel 14, G transmitted light rays 23 traveled through the G liquid crystal panel 18 and B transmitted light rays 24 traveled through the B liquid crystal panel 21 are combined for color combination by a cross dichroic prism 25, and composite color light rays 26 are projected through a projection lens 27 on a screen, not shown.

An exhaust fan 43 for cooling the discharge lamp 1 is disposed near the discharge lamp 1 and the lamp reflector 3 to discharge hot air 45 heated by heat generated by the high-temperature discharge lamp 1, i.e., the light source, from a case 44 in order that the component parts of the liquid crystal projector may not be affected by heat generated by the discharge lamp 1. A suction fan 46 sucks ambient air into the case 44. A lamp power supply 31 is disposed near the discharge lamp 1.

The first dichroic mirror 40, the second dichroic mirror 15, the first mirror 13, the second mirror 19 and the third mirror 20 included in a color separating optical system are arranged around the cross dichroic prism 25. An illuminating optical system is designed for efficient use of illuminating light and comprises the discharge lamp 1, the lamp reflector 3, the lens 4, the lens 5, the polarizing device 6, and an optical integrating means comprising the first lens array 7, the mirror 8 and the second lens array 9. The lamp power supply 31 for supplying power to the discharge lamp 1 is disposed adjacent to the discharge lamp 1.

In the second embodiment, a linear arrangement of the projection lens 27, the cross dichroic prism 25 and the color separating optical system, the illuminating optical system and the lamp power supply 31 are arranged in that order.

When the projection lens 27 is contained in the case 44 and the liquid crystal projector has projecting parts projecting outside from the case 44, the outside size in a horizontal plane of the liquid crystal projector including the projecting parts is substantially equal to or smaller than the A4 folder size. The outside size of the liquid crystal projector in the second embodiment is 230 mm in depth and 307 mm in width.

The liquid crystal projector in the second embodiment is formed, similarly to the liquid crystal projector in the first embodiment, in the outside size suitable for storing the liquid crystal projector in a prevalently used storage cabinet and for carrying the same in a prevalently used carrying case.

In the second embodiment, the projection lens 27 is disposed in the depth of the case 44. Therefore, the liquid crystal projector can be constructed so that the distance between the display surface of the G liquid crystal panel 18 and the extremity of the projection lens 27 is sufficiently great. Increase in the distance between the display surface of the G liquid crystal panel 18 and the extremity of the projection lens 27 increases the degree of freedom of design of the projection lens and enables the use of a high-performance projection lens unit. If the width of the liquid crystal projector is greater than the depth of the same, various different layouts of the liquid crystal projector are possible.

The distance between the display surface of the G liquid crystal panel 18 and the extremity of the projection lens 27 is 135 mm in the second embodiment. If a recess formed in the right side, as viewed in FIG. 4, may be omitted, the distance between the display surface of the G liquid crystal panel 18 and the extremity of the projection lens 27 can be increased up to 170 mm.

Figure 5:
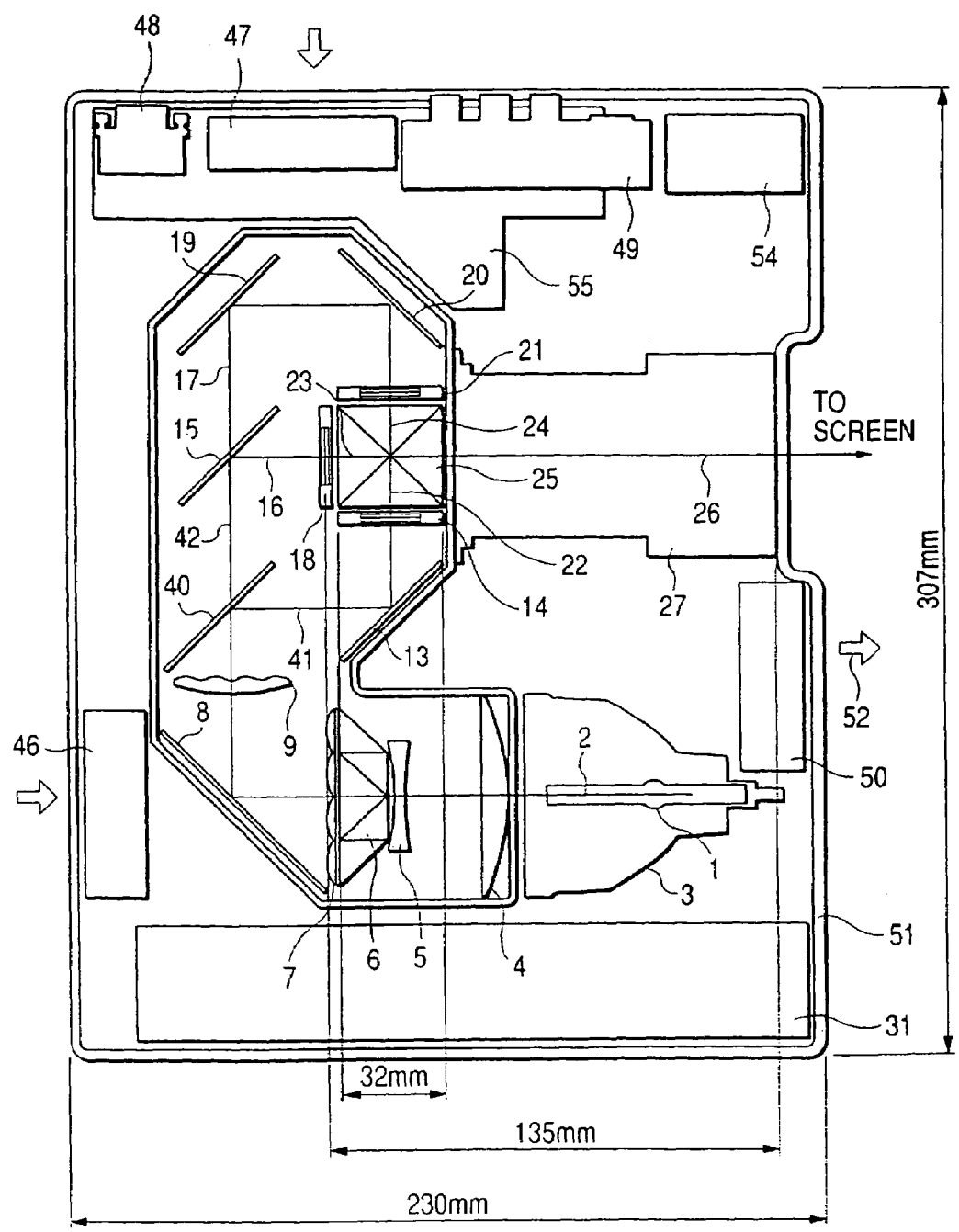
FIG. 5 is a schematic plan view of a liquid crystal projector in a third embodiment according to the present invention.

FIG. 5 shows a liquid crystal projector in a third embodiment according to the present invention in a schematic plan view. The liquid crystal projector in the third embodiment differs from the liquid crystal projector in the second embodiment shown in FIG. 4 in that, in the third embodiment, component parts including an exhaust fan 50 are arranged in an improved layout, and a projection lens 27 is disposed in a front part, i.e., a right part as viewed in FIG. 5, of a case 51. The exhaust fan 50 for cooling a discharge lamp 1, i.e., a light source, is disposed at a position near the discharge lamp 1 and a lamp reflector 3 and laterally dislocated relative to the discharge lamp 1 to discharge hot air 52 heated by heat generated by the high-temperature discharge lamp 1 from a case 51 in order that the component parts of the liquid crystal projector may not be affected by heat generated by the discharge lamp 1.

In the third embodiment, an available space is formed in a back part, i.e., a part on the left side of a color separating optical system as viewed in FIG. 5, of the case 51. The available space increases the degree of freedom of designing the layout of the component parts of electric circuits and enables the use of a high-performance electric circuits having enhanced functions.

In the liquid crystal projector in the third embodiment, the distance between the display surface of the G liquid crystal panel 18 and the extremity of the projection lens 27 is 135 mm. The same distance can be increased up to 170 mm by shifting the color separating optical system to the left, as viewed in FIG. 5.

Figure 6:
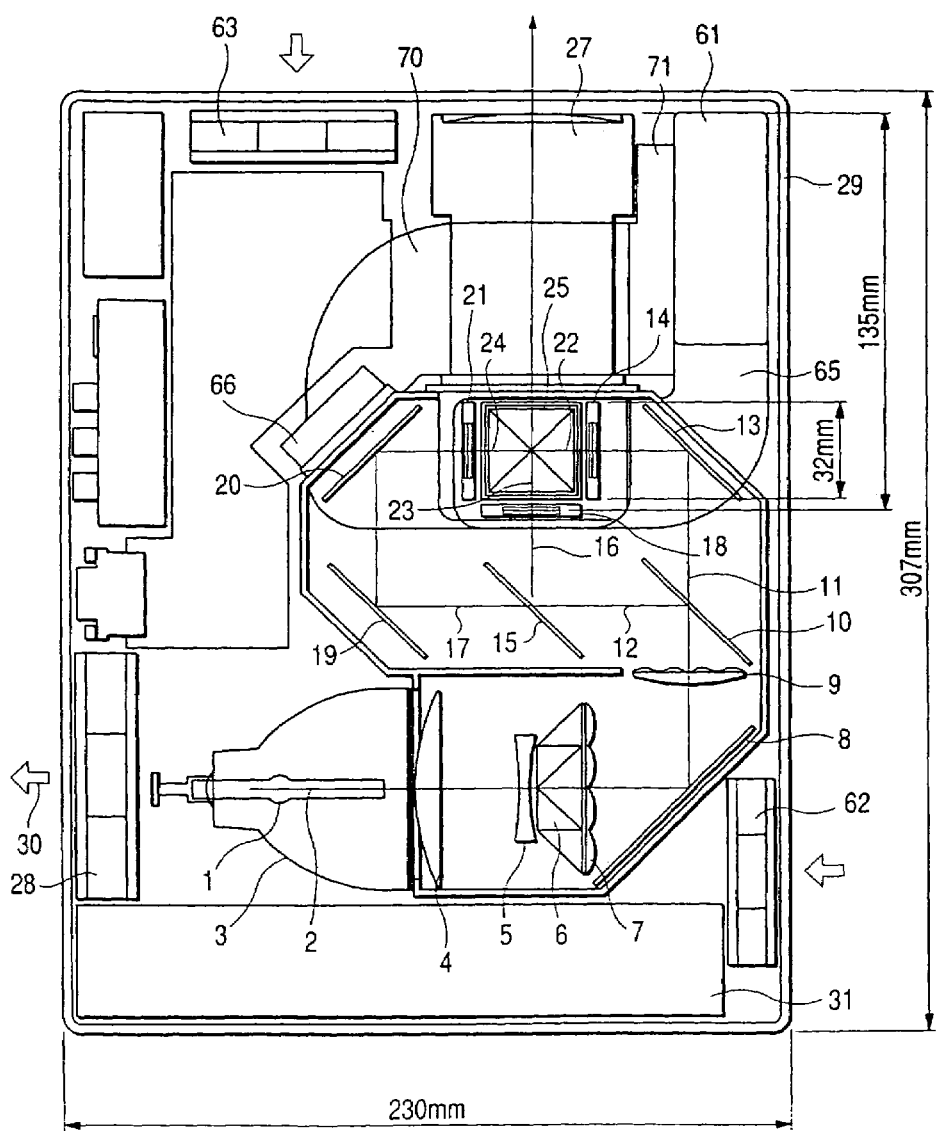
FIG. 6 is a schematic plan view of a liquid crystal projector in a fourth embodiment according to the present invention.
Figure 7:
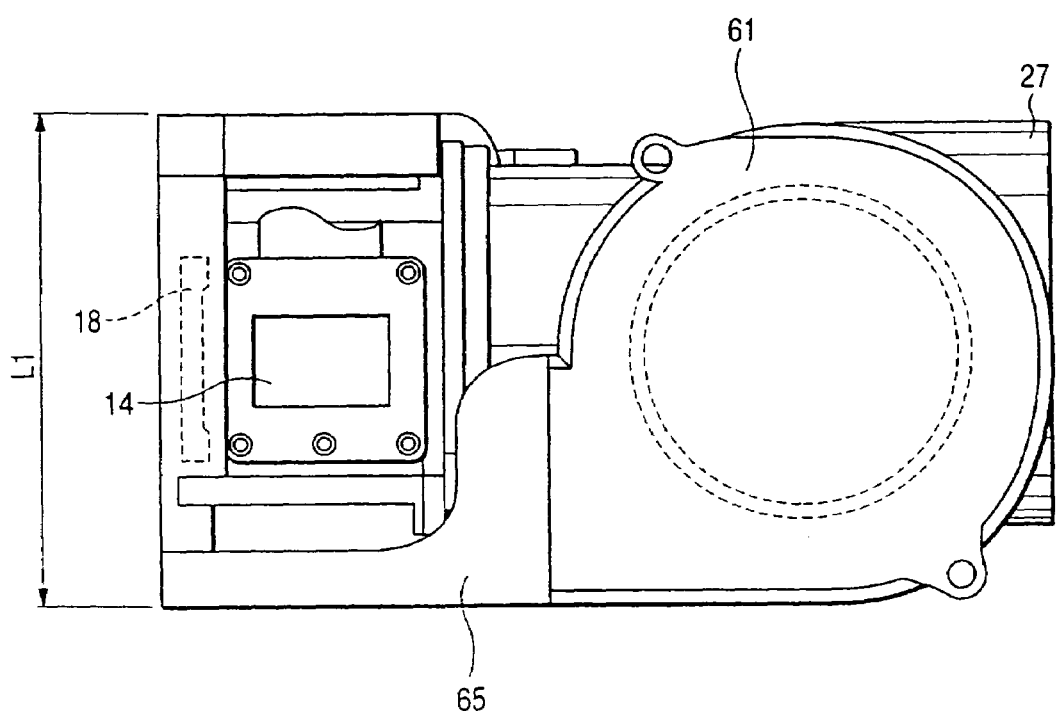
FIG. 7 is a schematic side view of a part of the liquid crystal projector around liquid crystal panels.

FIG. 6 is a schematic plan view of a liquid crystal projector in a fourth embodiment according to the present invention and FIG. 7 is a side view of a liquid crystal panel and a cooling fan included in the liquid crystal projector of FIG. 6.

The liquid crystal projector in the fourth embodiment is provided with a cooling system in addition to the components of the liquid crystal projector in the first embodiment shown in FIG. 2. The cooling system comprises a cooling fan 61 disposed beside the projection lens 27 to cool the liquid crystal panels 14, 18 and 21, and a duct for guiding air delivered by the cooling fan 61 to the liquid crystal panels 14, 18 and 21. The cooling system will be described later.

The operation of the liquid crystal projector in the fourth embodiment is similar to that of the liquid crystal projector in the first embodiment. Illuminating light rays emitted by a discharge lamp 1 are guided by an illuminating optical system to a color separating optical system, the color separating optical system divides the light rays into R light rays 11, G light rays 16 and B light rays 17, the R light rays 11, the G light rays and the B light rays fall on the liquid crystal panels 14, 18 and 21, respectively. R transmitted light rays 22, G transmitted light rays 23 and B transmitted light rays 24 traveled through the liquid crystal panels 14, 18 and 21, respectively, are combined by a cross dichroic prism 25, and composite color light rays provided by the cross dichroic prism 25 are projected through the projection lens 27 on a screen, not shown.

An exhaust fan 28 is disposed near a discharge lamp 1 and a lamp reflector 3 to discharge hot air 30 outside a case 29 included in the liquid crystal projector. A lamp power supply 31 is disposed near the discharge lamp 1. The projection lens 27, the cross dichroic prism 25, the color separating optical system, the illuminating optical system and the lamp power supply 31 are arranged in that order.

The outside size in a horizontal plane of the case 29 of the liquid crystal projector in the fourth embodiment including projecting parts, if any, is substantially equal to or below the A4 folder size. The outside size of the liquid crystal projector in the fourth embodiment is 307 mm in depth and 230 mm in width. Since the maximum A4 folder size is 263 mm by 318 mm, the liquid crystal projector is formed in an outside size not greater than the maximum A4 folder size. The liquid crystal projector in the fourth embodiment can be stored in a prevalently used storage cabinet and can be carried in a prevalently used carrying case.

The liquid crystal panels employed in the liquid crystal projector in the fourth embodiment formed in the foregoing outside size have a screen size of 0.9 in., which is small as compared with the screen size of 1.3 in. of the liquid crystal panels employed in the prior art liquid crystal projector.

Therefore, the projection lens 27 and the dichroic prism may be of small sizes and the color separating optical system can be miniaturized accordingly.

The cooling fan 61 disposed in a space contiguous with the projection lens 27 to cool the liquid crystal panels 14, 18 and 21 is a multiblade fan, i.e., a centrifugal fan. Cooling air delivered by the cooling fan 61 is distributed by a first to a fourth duct (only a first duct 65 and a third duct 70 are shown in FIG. 6) to cool the liquid crystal panels 14, 18 and 21. A heatsink 66 is combined with the duct.

Thus, the space contiguous with the projection lens 27 is used for cooling the liquid crystal panels 14, 18 and 21 and the liquid crystal projector can be formed in the outside size not greater than the A4 folder size.

In the liquid crystal projector in the fourth embodiment, the component parts are arranged such that the distance between the display surface of the liquid crystal panel 18 and the extremity of the projection lens 27 is 135 mm to form the liquid crystal projector in the outside size not greater than the A4 folder size. For a greater A4 folder size, the distance between the display surface of the liquid crystal panel 18 and the extremity of the projection lens 27 may be 146 mm or below. The size in a horizontal plane of the cross dichroic prism 25 is 32 mm by 32 mm. The width of the liquid crystal projector may be greater than the depth of the same.

Figure 8:
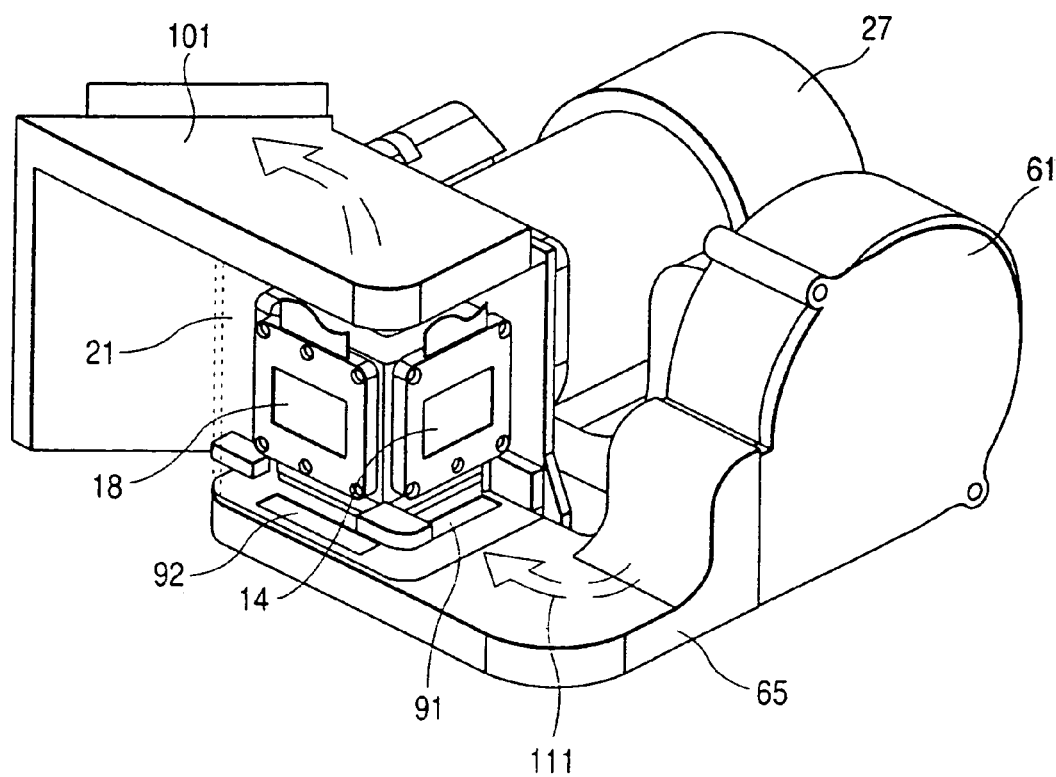
FIG. 8 is a perspective view of a cooling system included in the liquid crystal projector of FIG. 6.
Figure 9:
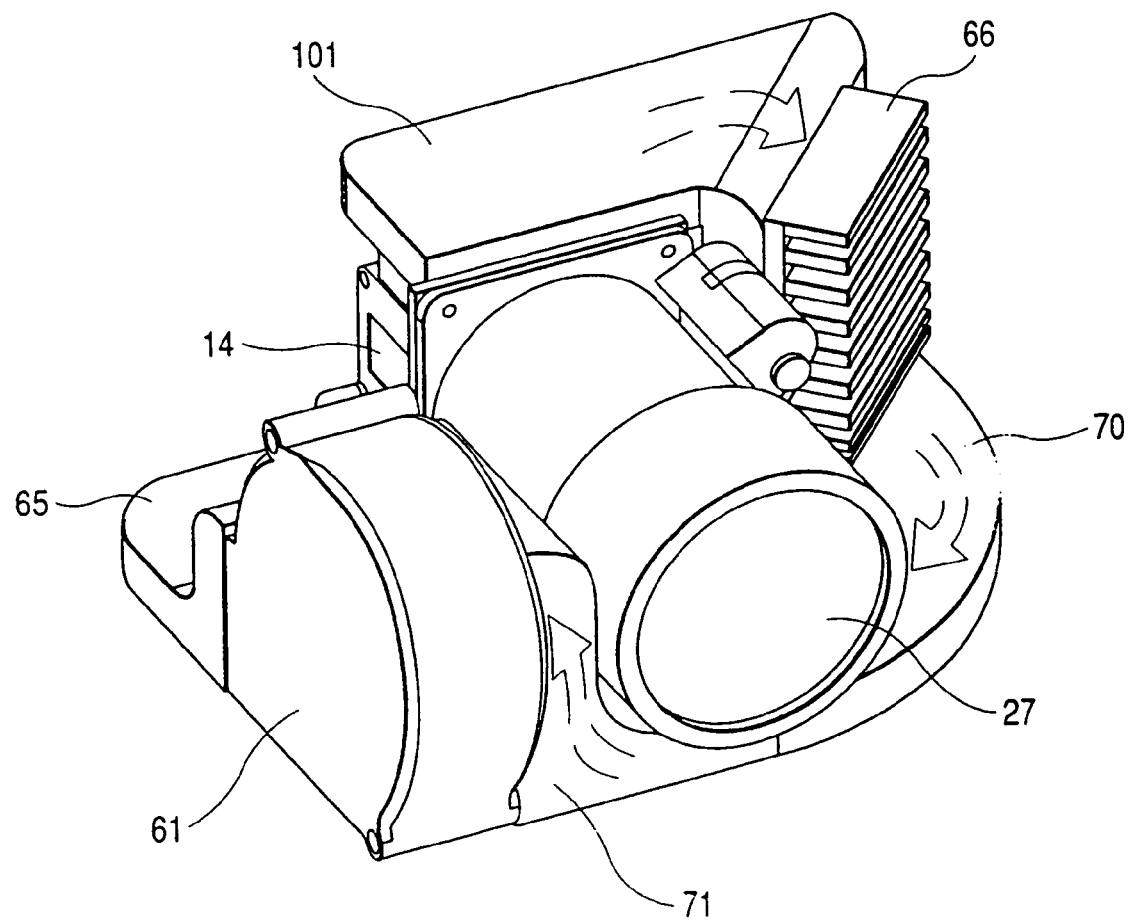
FIG. 9 is a perspective view of the cooling system included in the liquid crystal projector of FIG. 6.
Figure 10:
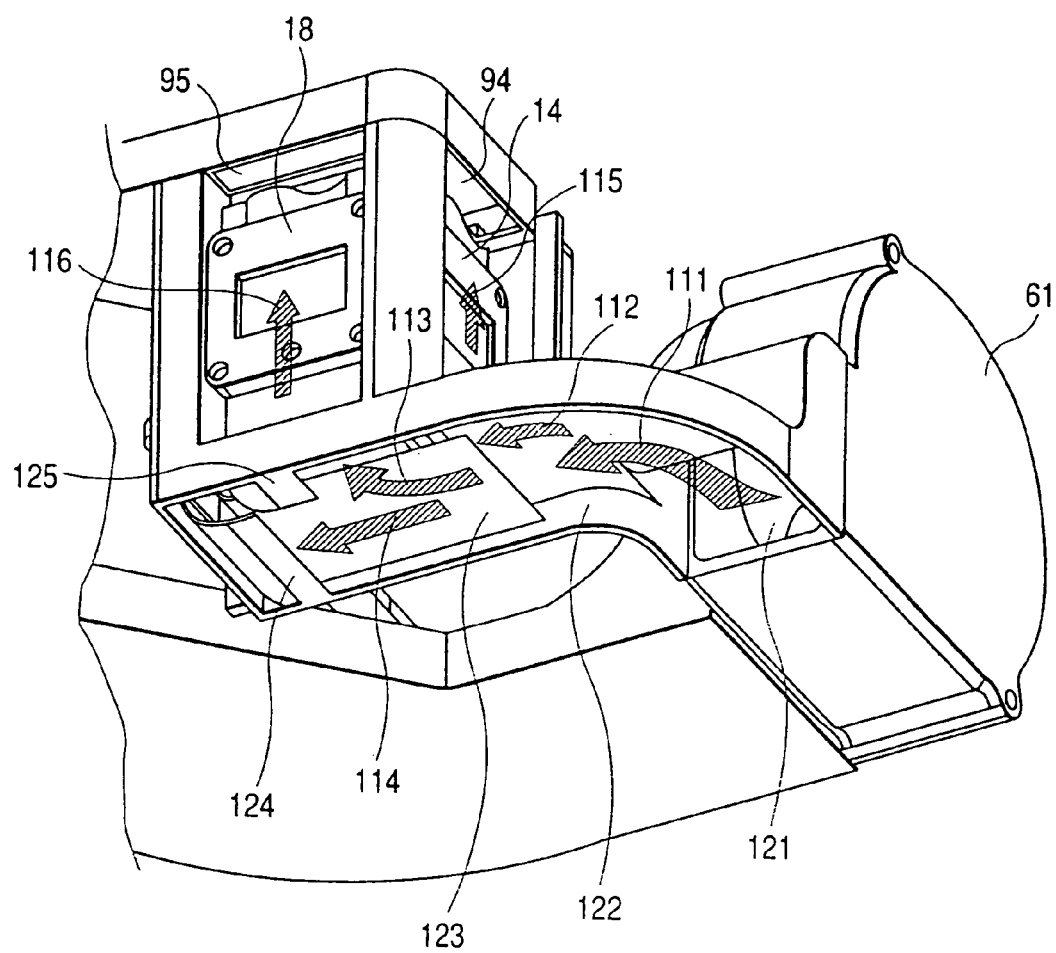
FIG. 10 is a bottom perspective view of the cooling system included in the liquid crystal projector of FIG. 6.

A cooling system according to the present invention will be describe with reference to FIGS. 8, 9 and 10. FIG. 8 is a perspective view of a cooling system as viewed from the side of the illuminating optical system in FIG. 6, FIG. 9 is a perspective view of the cooling system as viewed from the side of the extremity of the projection lens 27 in FIG. 6, and FIG. 10 is a bottom perspective view of the cooling system.

A cooling fluid, such as air, a gas or a liquid, delivered by the cooling fan 61 flows through the duct 65 toward a space below the liquid crystal panels 14, 18 and 21 as indicated by the arrow 111 in FIGS. 8 and 10. A first guide plate 123, a second guide plate 124 and a third guide plate 125 are disposed in the duct 65. The flow of the cooling fluid indicated by the arrow 111 is divided into a cooling fluid flow 112 for cooling a B liquid crystal panel 14, a cooling fluid flow 113 for cooling a G liquid crystal panel 18 and a cooling fluid flow 114 for cooling an R liquid crystal panel 21 (FIG. 8). The cooling fluid flows 112, 113 and 114 are guided toward the liquid crystal panels 14, 18 and 21 to cool the liquid crystal panels 14, 18 and 21, respectively. The respective flow rates of the cooling fluid flows 112, 113 and 114 are adjusted properly by properly arranging the guide plates 123, 124 and 125. Generally, the guide plates 123, 124 and 125 are arranged such that the flow rates or the velocities of the cooling fluid flow 113 for cooling the G liquid crystal panel 18 which is heated at the highest temperature among those of the liquid crystal panels 14, 18 and 21, the cooling fluid flow 112 for cooling the B liquid crystal panel 14 which is heated at the second highest temperature, and the cooling fluid flow 114 for cooling the R liquid crystal panel 21 which is not heated at a very high temperature decrease in that order. Thus, the liquid crystal panels 14, 18 and 21 are heated at substantially the same temperature. The cooling fluid flows through inlets 91 and 92 shown in FIG. 8 and an inlet, not shown, for the R liquid crystal panel 21 in directions indicated by the arrows 115 and 116 to cool the liquid crystal panels 14, 18 and 21.

As shown in FIG. 9, the cooling fluid flows further through a second duct 101, and the heat of the cooling fluid is absorbed and dissipated by a heatsink 66 attached to a wall of the second duct 101 while the cooling fluid flows through the second duct 101. The cooling fluid flows further through a third duct 70 and a fourth duct 71 and returns to the cooling fan 61. The first duct 65, the second duct 101, the third duct 70 and the fourth duct 71 form a cooling fluid circulating passage, and the liquid crystal panels 14, 18 and 21 and the cooling fan 61 are sealed in the cooling fluid circulating passage. Therefore foreign matters are unable to enter the cooling fluid circulating passage and the undesirable projection of images of dust particles adhering to the display surfaces of the liquid crystal panels 14, 18 and 21 can be avoided. The first duct 65, the second duct 101, the third duct 70 and the fourth duct 71 need not necessarily be connected so as to form a sealed cooling fluid circulating passage. The cooling system may be provided with only the first duct 65 and the display surfaces of the liquid crystal panels 14, 18 and 21 may be covered with glass plates, respectively, to prevent troubles attributable to dust adhering to the display surfaces of the liquid crystal panels 14, 18 and 21.

In the cooling system embodying the present invention, the flow of the cooling fluid delivered by the cooling fan 61 is divided by the guide plates 123, 124 and 125, three pipes or the like may be used for the same purpose instead of the guide plates 123, 124 and 125.

Figure 11:
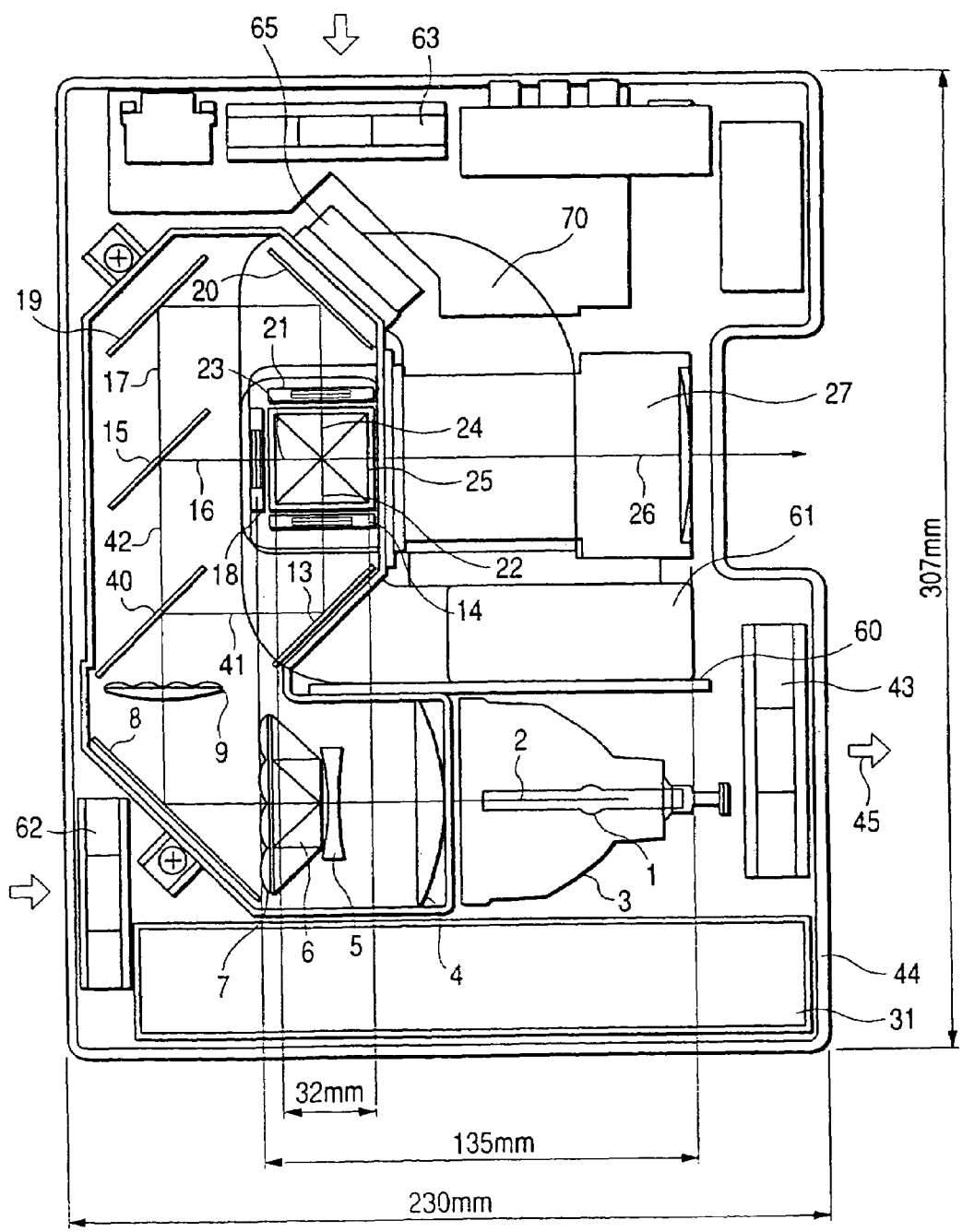
FIG. 11 is a schematic plan view of a liquid crystal projector in a fifth embodiment according to the present invention.

FIG. 11 shows a liquid crystal projector in a fifth embodiment according to the present invention in a schematic plan view. The liquid crystal projector in the fifth embodiment is similar to the liquid crystal projector in the second embodiment and differs only in that the liquid crystal projector in the fifth embodiment is provided additionally with a cooling system. The cooling system comprises a cooling fan 61 disposed beside a projection lens 27 to deliver air for cooling liquid crystal panels 14, 18 and 21, and a duct for guiding air delivered by the cooling fan 61 to the liquid crystal panels 14, 18 and 21.

The liquid crystal projector in the fifth embodiment operates similarly to the liquid crystal projector in the second embodiment. A discharge lamp 1 emits illuminating light rays, the illuminating light rays are guided by an illuminating optical system to a color separating optical system, and the color separating optical system separates the illuminating light rays into R light rays 41, G light rays 16 and B light rays 17 so that the R light rays 41, the G light rays 16 and the B light rays 17 fall on liquid crystal panels 14, 18 and 21. R transmitted light rays 22, G transmitted light rays 23 and B transmitted light rays 24 traveled through the liquid crystal panels 14, 18 and 21 are combined for color combination by a cross dichroic prism 25 and composite light rays are projected by a projection lens 27 on a screen, not shown.

An exhaust fan 43 for cooling a light source is disposed near a discharge lamp and a lamp reflector 3 to discharge hot air 45 outside a case included in the liquid crystal projector. A lamp power supply 31 is disposed near the discharge lamp 1. A linear arrangement of the projection lens 27, the cross dichroic prism 25 and the color separating optical system, the illuminating optical system and the lamp power supply 31 are arranged in that order.

In the liquid crystal projector shown in FIG. 11, a cooling fan 61, similarly to the cooling fan 61 employed in the fourth embodiment, is disposed beside the projection lens 27. The basic constitution of the cooling system is the same as that illustrated in FIGS. 8, 9 and 10. The cooling fan 61 disposed near the lamp reflector 3 is subject to the influence of heat and must be protected by a heat insulating plate 60 or the like. The effect of the fifth embodiment in being formed in a compact construction and in a small height is the same as that of the fourth embodiment.

The liquid crystal projector may be formed in a construction in which all the component parts thereof including the projection lens 27 are contained in a case 44 as shown in FIG. 11, or may be formed in a construction in which projecting parts, such as a projecting part of the projection lens 27, a handle and the like, projects from the case 44. The outside size in a horizontal plane of the liquid crystal projector in either construction is not greater than the A4 folder size. The liquid crystal projector in the fifth embodiment is 230 mm in depth and 307 mm in width. The size in a horizontal plane of the cross dichroic prism 25 is 32 mm by 32 mm. The distance between the display surface of the liquid crystal panel 18 and the extremity of the projection lens 27 is 135 mm.

The liquid crystal projector in the fifth embodiment, similarly to the liquid crystal projector in the second embodiment, can be stores in a prevalently used storage cabinet and can be carried in a prevalently used carrying case.

In the fifth embodiment, the projection lens 27 is disposed in the depth of the case 44. Therefore, the liquid crystal projector can be constructed so that the distance between the display surface of the liquid crystal panel 18 and the extremity of the projection lens 27 is sufficiently great. Generally, increase in the distance between the display surface of the liquid crystal panel 18 and the extremity of the projection lens 27 increases the degree of freedom of design of the projection lens and enables the use of a high-performance projection lens.

Figure 12:
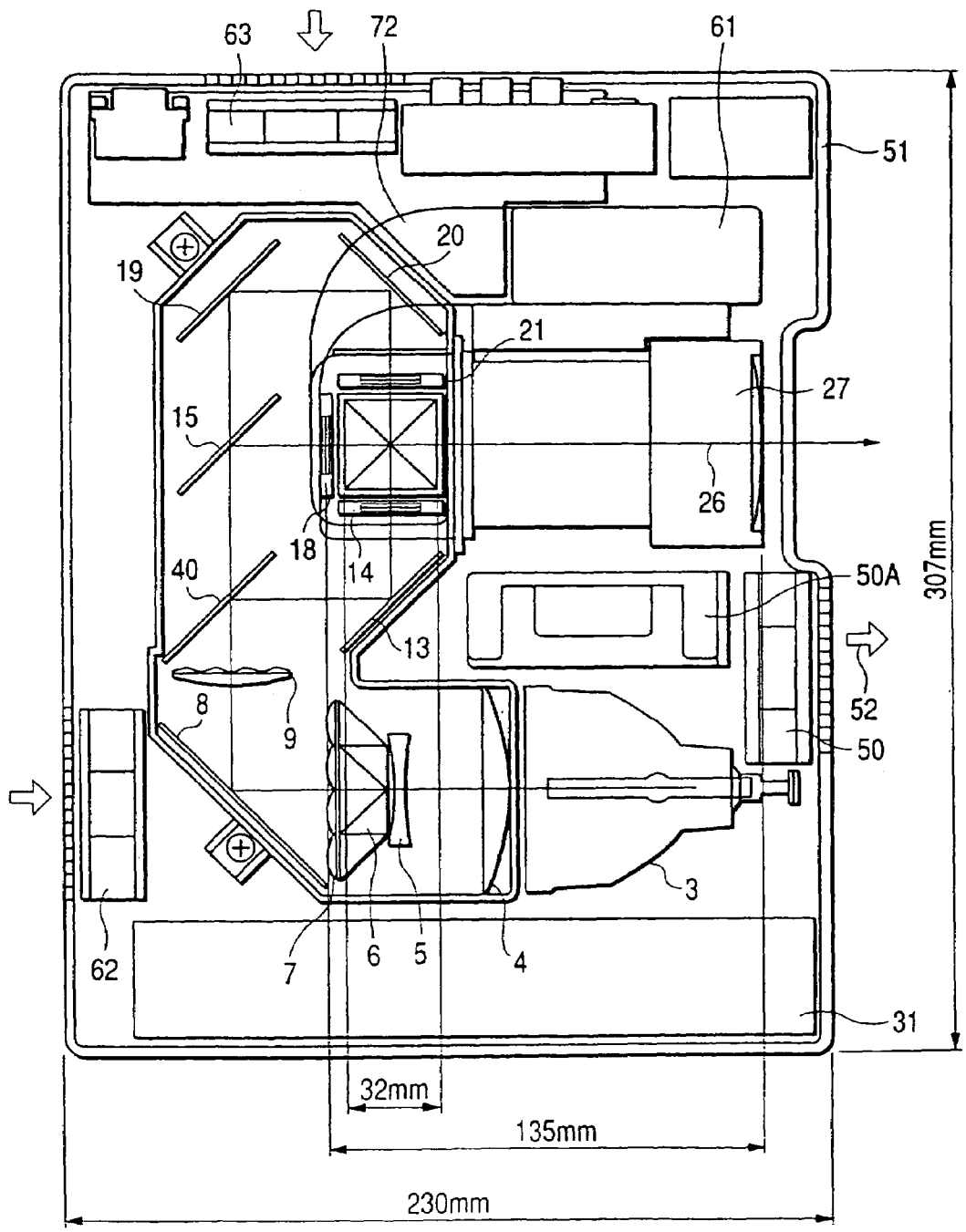
FIG. 12 is a schematic plan view of a liquid crystal projector in a sixth embodiment according to the present invention.

FIG. 12 shows a liquid crystal projector in a sixth embodiment according to the present invention in a schematic plan view. The liquid crystal projector in the sixth embodiment differs from that in the fifth embodiment in that, in the sixth embodiment, component parts including an exhaust fan 50 are arranged in an improved layout, and a projection lens 27 is disposed in a front part of a case 51. The exhaust fan 50 for cooling a light source is disposed at a position near a discharge lamp 1 and a lamp reflector 3 and laterally dislocated relative to the discharge lamp 1 to discharge hot air 52 heated by heat generated by the high-temperature discharge lamp 1 from the case 51 in order that the component parts of the liquid crystal projector may not be affected by heat generated by the discharge lamp 1.

In the sixth embodiment, a cooling fan 61 is disposed beside the projection lens 27 on one side of the projection lens 27 opposite the other side on which a lamp reflector 3 is disposed. to cool liquid crystal panels 14, 18 and 21 efficiently without being affected by heat radiated from the lamp reflector. A cooling system for cooling the liquid crystal panels 14, 18 and 21 in the sixth embodiment is substantially the same in basic construction as that of the fifth embodiment and is in inverse positional relation with that of the fifth embodiment. Further, as the exhaust fan 50, blower fan 50A may be used as shown in FIG. 12.

An available space is formed in a back part of the case 51, which increases the degree of freedom of designing the layout of electrical parts for electric circuits and enables the use of a high-performance electric circuits having enhanced functions. The liquid crystal projector in the sixth embodiment is 230 mm in depth and 307 mm in width. The size in a horizontal plane of a cross dichroic prism 25 employed in the sixth embodiment is 32 mm by 32 mm, and the distance between the display surface of the liquid crystal panel 18 and the extremity of the projection lens 27 is 135 mm.

In any one of the foregoing embodiments, the optical system includes at least the illuminating optical system and the color separating optical system, and is provided additionally with the liquid crystal panels and the cross dichroic prism. The projection unit comprises the projection lens, the liquid crystal panels and the cross dichroic prism.

As is apparent from the foregoing description, according to the present invention, the outside size in a horizontal plane of the liquid crystal projector including the projecting parts at least in a folded state is not greater than the A4 folder size and hence the liquid crystal projector can be stored in a prevalently used storage cabinet and can be carried in a prevalently used carrying case. The cooling space can be disposed in a small space, the plurality of liquid crystal panels are cooled properly at substantially the same temperature according to the respective heat generating rates thereof.

The invention may be embodied in other specific forms without departing from the spirit or essential characteristics thereof. The embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid crystal projector comprising:
   a liquid crystal panel;
   a projection lens;
   a cooling fluid circulating system having a centrifugal cooling fan disposed at one lateral side of said projection lens and a sealed duct including said liquid crystal panel;
   a cooling system for cooling said sealed duct from outside disposed at another lateral side of said projection lens; and
   a housing having said liquid crystal panel, said projection lens, said cooling fluid circulating system and said cooling system disposed entirely therein,
   wherein said cooling fluid circulating system cools said liquid crystal panel directly, and said cooling system cools said liquid crystal panel indirectly.

2. The liquid crystal projector according to claim 1, wherein said cooling fluid circulating system is provided with said centrifugal cooling fan used specially for cooling said liquid crystal panel.

3. The liquid crystal projector according to claim 2, wherein said sealed duct comprises a first duct and a second duct, and said cooling fluid is caused by said centrifugal cooling fan to pass through said first duct, said liquid crystal panel, and said second duct and returns to said centrifugal cooling fan.

4. The liquid crystal projector according to claim 3, wherein said cooling system comprises a heat sink.

5. A liquid crystal projector comprising:
   a plurality of liquid crystal panels;
   a projection lens;
   a cooling fluid circulating system having a centrifugal cooling fan disposed at one lateral side of said projection lens and a sealed duct including said plurality of liquid crystal panels;
   a cooling system for cooling said sealed duct from outside disposed at another lateral side of said projection lens; and
   a housing having said liquid crystal panel, said projection lens, said cooling fluid circulating system and said cooling system disposed entirely therein,
   wherein said cooling fluid circulating system cools said plurality of liquid crystal panels directly, and said cooling system cools said plurality of liquid crystal panels indirectly.

6. The liquid crystal projector according to claim 5, wherein said first cooling fluid circulating system is provided with said centrifugal cooling fan used specially for cooling said plurality of liquid crystal panels.

7. The liquid crystal projector according to claim 6, wherein said sealed duct comprises a first duct and a second duct, and said first cooling fluid is caused by said centrifugal cooling fan to pass through said first duct, said plurality of liquid crystal panels, and said second duct and returns to said centrifugal fan.

8. The liquid crystal projector according to claim 7, wherein said cooling system comprises a heat sink.

9. A liquid crystal projector comprising:
   a plurality of liquid crystal panels;
   a projection lens;
   a cooling fluid circulating system having a cooling fan disposed at one lateral side of said projection lens and a sealed duct including said plurality of liquid crystal panels, said cooling fan being used specifically for cooling said plurality of liquid crystal panels and said duct comprising a first duct and a second duct, and said cooling fluid is caused by said cooling fan to pass through said first duct, said liquid crystal panel, and said second duct and returns to said cooling fan;
   a cooling system for comprising a heat sink for cooling said sealed duct from outside disposed at another lateral side of said projection lens; and
   wherein said first duct has guide members in the inside and said guide members divide said cooling wind and supply said divided cooling wind to each of said plurality of liquid crystal panels;
   a housing having said plurality of liquid crystal panels, said cooling fluid circulating system and said cooling system mounted therein; and
   wherein said cooling fluid circulating system cools said plurality of liquid crystal panels directly, and said cooling system cools said plurality of liquid crystal panels indirectly.

10. A liquid crystal projector comprising:
    a plurality of liquid crystal panels;
    a projection lens;
    a cooling fluid circulating system having a cooling fan disposed at one lateral side of said projection lens and a sealed duct including said plurality of liquid crystal panels;
    a cooling system for cooling said sealed duct from outside disposed at another lateral side of said projection lens; and
    a housing having said liquid crystal panel, said cooling fluid circulating system and said cooling system mounted therein, and
    wherein said cooling fluid circulating system cools said plurality of liquid crystal panels directly, and said cooling system cools said plurality of liquid crystal panels indirectly, and
    further comprising a plurality of guide members disposed in said duct and for dividing a cooling fluid delivered by said cooling fan into plural cooling fluid flows for cooling each of said plurality of liquid crystal panels respectively, one of the plural cooling fluid flows having a greater flow rate or a velocity than another plural cooling fluid flow.

* * * * *